(12) United States Patent
Kim et al.

(10) Patent No.: US 9,226,454 B2
(45) Date of Patent: Jan. 5, 2016

(54) APPARATUS AND METHOD FOR CONTROLLING LIGHTING IN PLANT FACTORY

(71) Applicant: Electronics and Telecommunications Research Institute, Daejeon (KR)

(72) Inventors: Kyu-Hyung Kim, Daegu (KR); Ae-Kyeung Moon, Daegu (KR); Soo-In Lee, Daegu (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 29 days.

(21) Appl. No.: 14/291,520

(22) Filed: May 30, 2014

(65) Prior Publication Data

US 2014/0376239 A1 Dec. 25, 2014

(30) Foreign Application Priority Data

Jun. 24, 2013 (KR) ........................ 10-2013-0072734

(51) Int. Cl.
*A01G 7/04* (2006.01)
*F21V 21/14* (2006.01)
*A01G 9/26* (2006.01)

(52) U.S. Cl.
CPC *A01G 7/045* (2013.01); *A01G 9/26* (2013.01); *F21V 21/14* (2013.01)

(58) Field of Classification Search
CPC ......... F21V 17/02; F21V 19/02; F21V 21/14; F21V 14/02; A01G 1/00; A01G 1/001; A01G 7/045; A01G 9/00; A01G 9/26; G06Q 50/02
See application file for complete search history.

(56) References Cited

U.S. PATENT DOCUMENTS

| 7,475,512 B2* | 1/2009 | Van Den Dool | ....... A01G 7/045 47/17 |
| 8,845,149 B2* | 9/2014 | Cheng | ................. F21V 33/0028 362/1 |
| 2006/0032115 A1* | 2/2006 | Van Den Dool | ......... A01G 7/045 47/17 |
| 2010/0115837 A1* | 5/2010 | Van Der Poel | ......... A01G 7/045 47/66.6 |
| 2013/0258684 A1* | 10/2013 | Yang | ........................ A01G 9/26 362/386 |
| 2015/0230409 A1* | 8/2015 | Nicole | ................... A01G 7/045 47/17 |

FOREIGN PATENT DOCUMENTS

| KR | 10-2010-0027908 | 3/2010 |
| KR | 10-2013-0001434 | 1/2013 |

* cited by examiner

*Primary Examiner* — Bao Q Truong
(74) *Attorney, Agent, or Firm* — Nelson Mullins Riley & Scarborough LLP; Anthony A. Laurentano (57) ABSTRACT

An apparatus and method for controlling lighting in a plant factory are disclosed. The apparatus includes a weight calculation unit, a height calculation unit, a light information extraction unit, and a distance control unit. The weight calculation unit calculates the weight of at least one crop being cultivated based on a sensing result received from a weight sensor disposed in a crop cultivation bed. The height calculation unit calculates the height of the crop based on information about the growth of the crop corresponding to the weight of the crop. The light information extraction unit extracts information about artificial light corresponding to the height of the crop based on the information about the growth of the crop. The distance control unit controls the height of an artificial lighting device based on the information about artificial light.

10 Claims, 6 Drawing Sheets

APPARATUS AND METHOD FOR CONTROLLING LIGHTING IN PLANT FACTORY

CROSS REFERENCE TO RELATED APPLICATION

This application claims priority to and the benefit of Korean Patent Application No. 10-2013-0072734, filed on Jun. 24, 2013, which is hereby incorporated by reference in its entirety into this application.

BACKGROUND OF THE INVENTION

1. Technical Field

The present invention relates generally to an apparatus and method for controlling lighting in a plant factory and, more particularly, to an apparatus and method for providing optimal lighting in accordance with the growth rate of crops being cultivated in a plant factory.

2. Description of the Related Art

To provide light energy required to cultivate crops in plant factories, artificial lighting devices are widely used, such as white fluorescent lamps, external electrode fluorescent lamps (EEFLs), light emitting diodes (LEDs), active matrix organic light emitting diodes (AMOLEDs), organic electroluminescent (EL) displays, and organic light emitting diodes (OLEDs).

For example, Korean Patent Application Publication No. 10-2013-0001434 entitled "Light Source Control System For Plant Factory" discloses light sources configurd to have different spectral distributions and to radiate light onto plants in a cultivation space, a reference reflection panel installed in the cultivation space and configured to reflect the radiated light from the light sources, a camera configured to measure the ratio between the intensities in respective wavelength ranges of light reflected from the reference reflection panel, and a controller configured to control power to be applied to the light sources based on the ratio between intensities in the respective wavelength ranges of light, which are measured by the camera.

The light source control system for a plant factory controls the light sources based on the ratio between the intensities in respective wavelength ranges of light reflected from the reference reflector, rather than the state of crops being cultivated. Therefore, there is a need for a technology for controlling light sources in accordance with the state of crops being cultivated.

In addition, the switching on/off of the light sources and the strength of light required to cultivate crops in a plant factory may be controlled using a separate lighting control device. In particular, artificial lighting devices, such as LEDs and metal-halide lamps, have the disadvantages of having a low efficiency because of the generation of heat, having the side effect of increasing the internal temperature of a plant factory and temperature around crops being cultivated, and increasing maintenance and repair cost because of a reduction in their lifespan attributable to the generation of heat.

SUMMARY OF THE INVENTION

Accordingly, the present invention has been made keeping in mind the above problems occurring in the conventional art, and an object of the present invention is to provide an apparatus and method for providing optimal lighting in accordance with the growth rate of crops being cultivated in a plant factory.

In accordance with an aspect of the present invention, there is provided a method for controlling lighting in a plant factory, the method including calculating the weight of at least one crop being cultivated based on a sensing result received from a weight sensor disposed in a crop cultivation bed; calculating the height of the crop based on information about the growth of the crop corresponding to the weight of the crop; extracting information about artificial light corresponding to the height of the crop based on the information about growth of the crop; and controlling a height of an artificial lighting device based on the information about artificial light.

Controlling the height of the artificial lighting device may include calculating the distance between the crop and the artificial lighting device based on the information about artificial light; and controlling the height of the artificial lighting device based on the calculated distance.

Calculating the weight of the crop may include calculating a net crop weight by subtracting the weights of other substances, such as soil, from the received sensing result.

The information about the growth of the crop may include information about the height of the crop corresponding to the weight of the crop and the information about artificial light corresponding to the height of the crop.

Controlling the height of the artificial lighting device may include controlling the height of the artificial lighting device by controlling a control motor corresponding to the artificial lighting device based on the information about artificial light.

In accordance with another aspect of the present invention, there is provided an apparatus for controlling lighting in a plant factory, the apparatus including a weight calculation unit configured to calculate the weight of at least one crop being cultivated based on a sensing result received from a weight sensor disposed in a crop cultivation bed; a height calculation unit configured to calculate the height of the crop based on information about the growth of the crop corresponding to the weight of the crop; a light information extraction unit configured to extract information about artificial light corresponding to the height of the crop based on the information about growth of the crop; and a distance control unit configured to control the height of an artificial lighting device based on the information about artificial light.

The distance control unit may calculate the distance between the crop and the artificial lighting device based on the information about artificial light, and may control the height of the artificial lighting device based on the calculated distance.

The weight calculation unit may calculate a net crop weight by subtracting the weights of substances, such as soil, from the received sensing result.

The apparatus may further include a unit configured to store the information about the growth of the crop, including information about the height of the crop corresponding to the weight of the crop and the information about artificial light corresponding to the height of the crop.

The distance control unit may control the height of the artificial lighting device by controlling a control motor corresponding to the artificial lighting device based on the information about artificial light.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention is described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clear.

An apparatus and method for providing optimal lighting in accordance with the growth rate of crops being cultivated in a plant factory according to embodiments of the present invention are described in detail below with reference to the accompanying drawings.

A plant factory to which the present invention is applied is an enclosed space that is adapted to cultivate crops while automatically controlling the conditions of an environment, soil, etc. and utilizing artificial lighting, such as the lighting of fluorescent lamps or LEDs, as lighting for the cultivation of crops.

Figure 1:
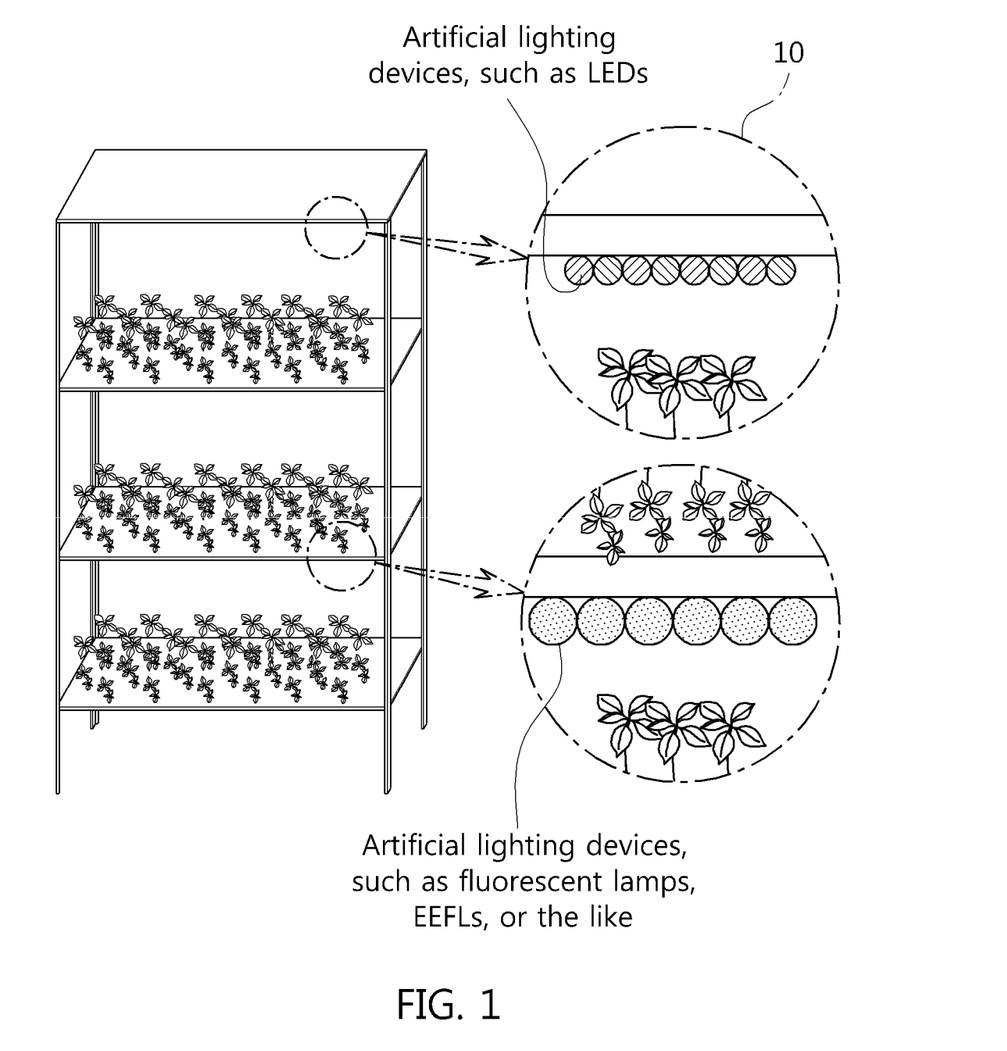
FIG. 1 is a diagram illustrating a plant factory in which a typical rack-type crop cultivation device has been employed.

FIG. 1 is a diagram illustrating a plant factory in which a typical rack-type crop cultivation device has been employed.

Referring to FIG. 1, the typical rack-type crop cultivation device includes a plurality of crop cultivation beds.

The crop cultivation beds may be arranged in three or more tiers depending on the type of crops or the size/location of the plant factory or both. In this case, one or more artificial lighting devices 10 are disposed in the upper portion of each tier, and thus provide lighting to crops, as illustrated in FIG. 1.

The configuration of the crop cultivation bed is described in detail below with reference to FIG. 2.

Figure 2:
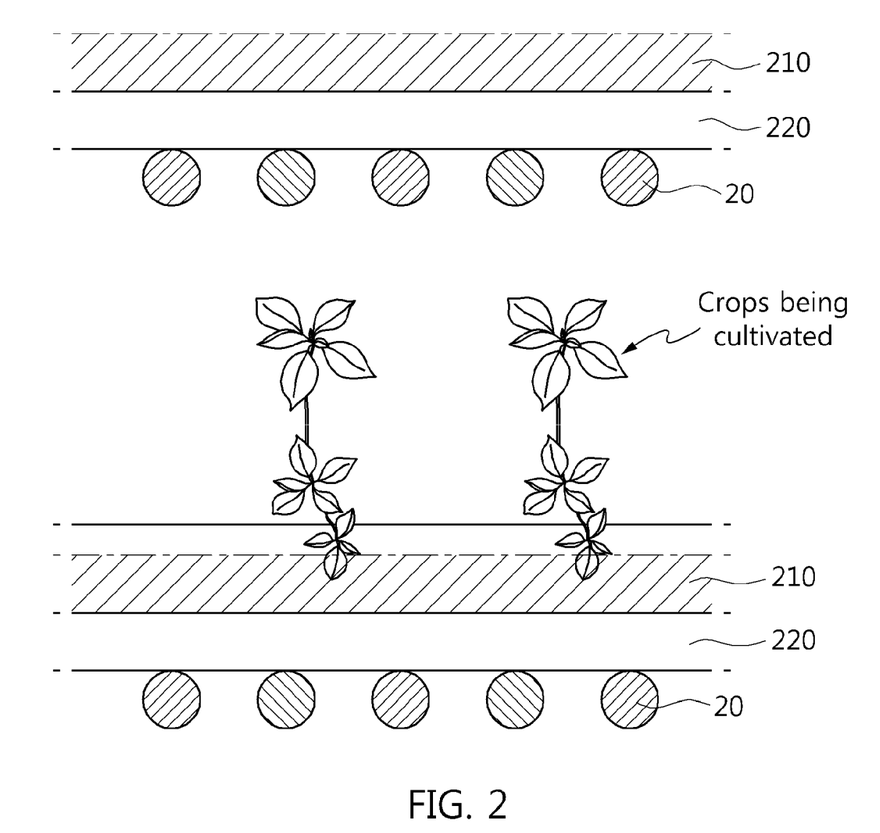
FIG. 2 is a diagram illustrating the configuration of a crop cultivation bed.

FIG. 2 is a diagram illustrating the configuration of the crop cultivation bed.

Referring to FIG. 2, the cultivation bed includes a nutrient solution passage 210 and an electric wiring channel 220. The electric wiring channel 220 is used to supply power to the artificial lighting devices 20 and sensors for artificial lighting control, nutrient solution control and environmental control. In this case, various types of sensors may be employed depending on the type of information to be measured.

The disadvantages of the artificial lighting of the cultivation bed of FIG. 2 are described below with reference to FIG. 3.

Figure 3:
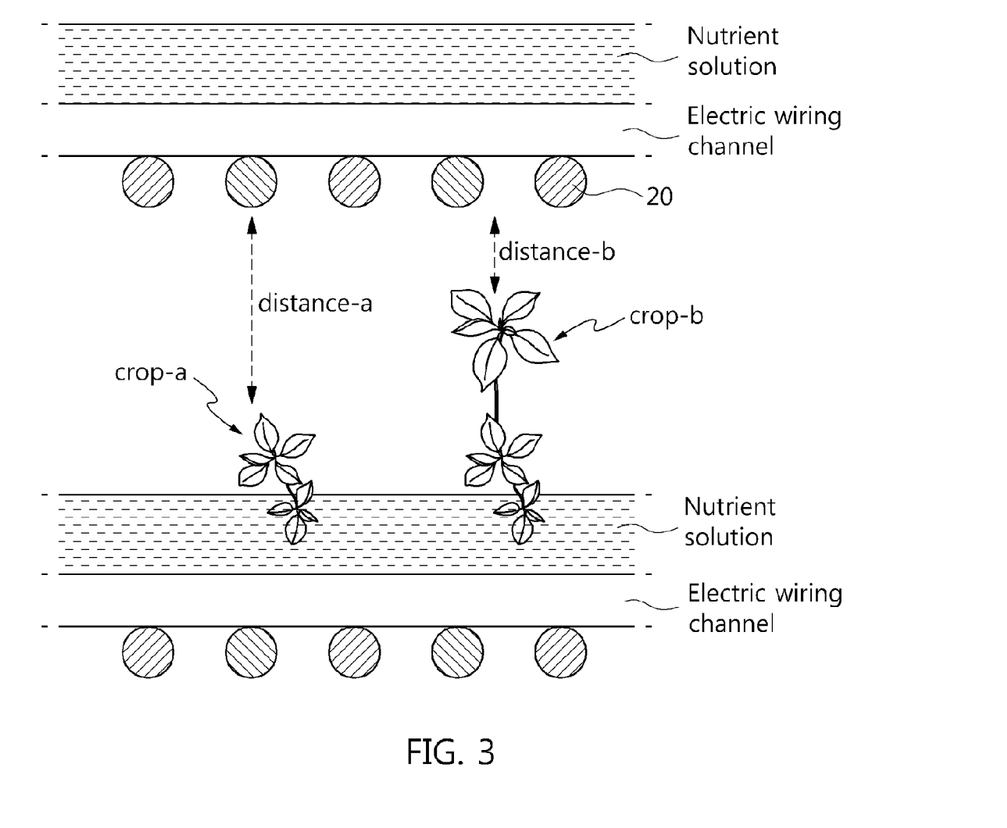
FIG. 3 is a diagram illustrating the disadvantages of a conventional crop cultivation bed.

FIG. 3 is a diagram illustrating the disadvantages of a conventional crop cultivation bed.

Referring to FIG. 3, a crop grows from the state of crop-a to the state of crop-b. In this case, the distance from crop-a to the artificial lighting device 20 is 'a' (i.e., distance-a), and the distance from crop-b to the artificial lighting device 20 is 'b' (i.e., distance-b).

In the case of crop-a, the amount of light output from the artificial lighting device 20 to crop-a is in inverse proportion to the square of distance-a. In order to supply artificial light required for crop-a, artificial lighting is controlled. In the same manner, in the case of crop-b, the amount of light output from the artificial lighting device 20 to crop-b is in inverse proportion to the square of distance-a. In order to supply artificial light required for crop-b, artificial lighting is controlled.

In this case, since the distance (distance-a or distance-b) is fixed, there may be a situation where more intensive artificial lighting needs to be supplied, which consumes more energy and causes an increase in cost attributable to a rise in temperature around the crop and a reduction in the lifespan of related equipment.

To overcome the above problems, there is provided an apparatus for controlling lighting in a plant factory according to an embodiment of the present invention, which is capable of controlling artificial lighting in accordance with the growth rate of crops in a plant factory, thereby minimizing the energy consumption of artificial lighting devices and also providing a uniform amount of lighting to crops being cultivated, which is described in detail with reference to FIGS. 4 and 5.

Figure 4:
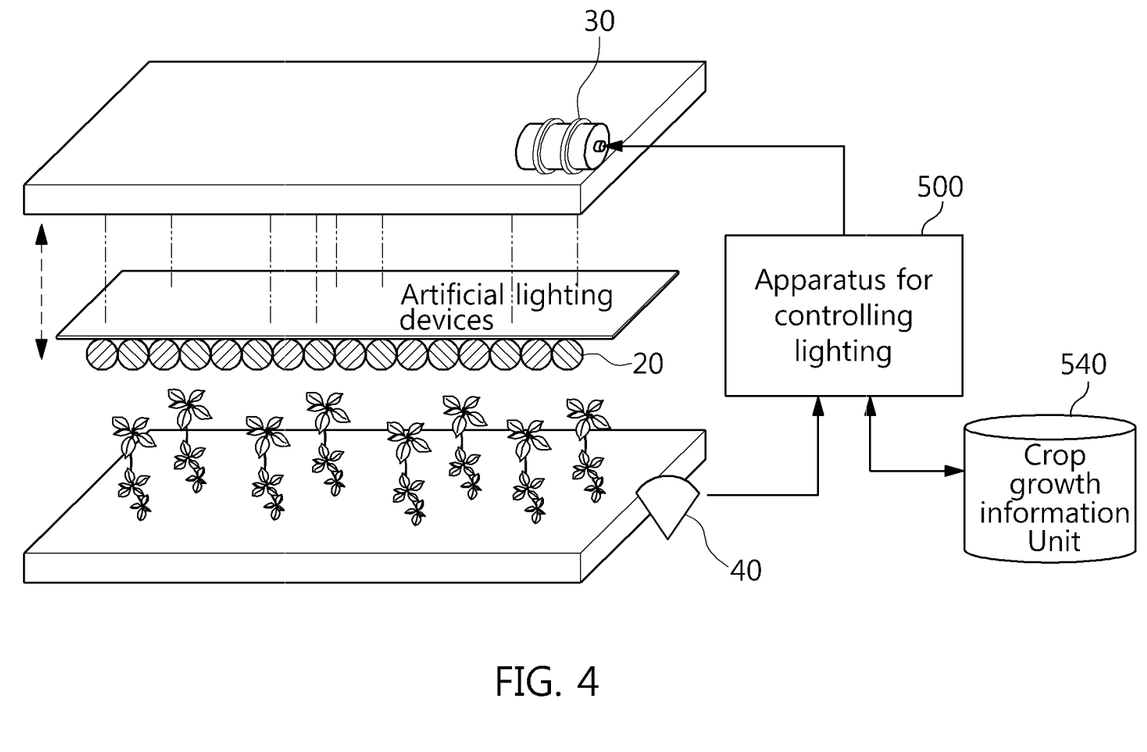
FIG. 4 is a diagram illustrating an environment to which an apparatus for controlling lighting in a plant factory according to an embodiment of the present invention is applied.

FIG. 4 is a diagram illustrating an environment to which an apparatus for controlling lighting in a plant factory according to an embodiment of the present invention is applied. FIG. 5 is a diagram schematically illustrating the configuration of an apparatus for controlling lighting in a plant factory according to an embodiment of the present invention.

Referring to FIG. 4, the environment to which an apparatus 500 for controlling lighting in a plant factory according to an embodiment of the present invention has been applied includes a weight sensor 40 configured to measure the weight of at least one crop, and a control motor 30 configured to control the height of an artificial lighting device based on an optimal energy value that is obtained based on the measured value, that is, a weight value, of the weight sensor 40 by an apparatus 500 for controlling lighting.

The weight sensor 40 measures the weight of the crop in order to determine the degree of growth of the crop. The weight sensor 40 may measure the weight of a single crop, and may measure the weight of crops in a specific range of a single crop cultivation bed or the entire range thereof.

Figure 5:
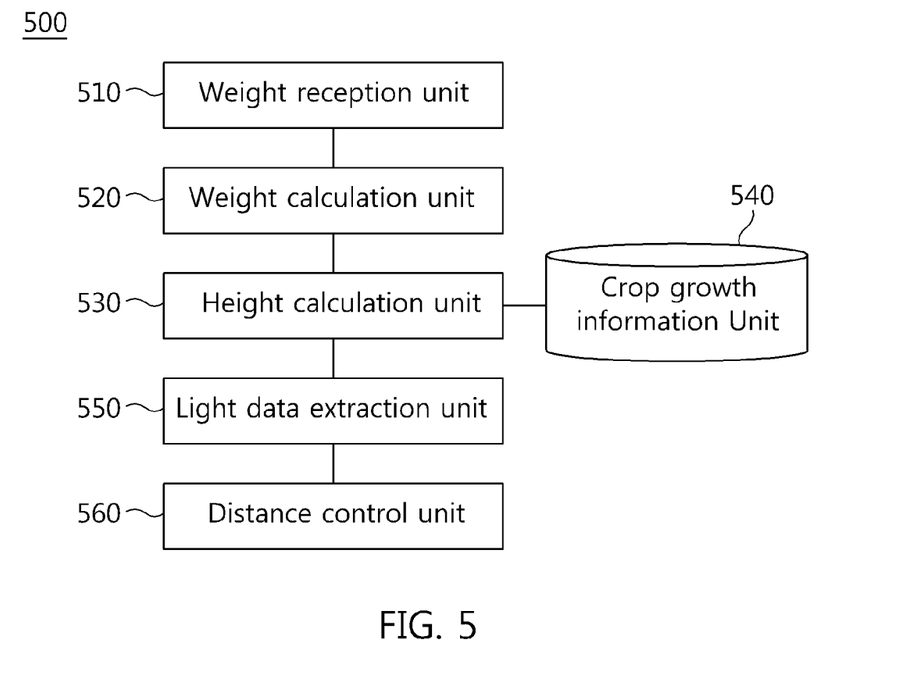
FIG. 5 is a diagram schematically illustrating the configuration of an apparatus for controlling lighting in a plant factory according to an embodiment of the present invention.

Referring to FIG. 5, the apparatus 500 for controlling lighting in a plant factory includes a weight reception unit 510, a weight calculation unit 520, a height calculation unit 530, a crop growth information unit 540, a light data extraction unit 550, and a distance control unit 560.

The weight reception unit 510 receives a crop weight value from the weight sensor 40. In this case, the crop weight value may be the weight of a single crop or the weight of crops in a specified range of a single crop cultivation bed or the entire range thereof.

The weight calculation unit 520 calculates a net crop weight value by processing the crop weight value received by the measured weight reception unit 510.

More specifically, the weight calculation unit 520 calculates the net crop weight by subtracting the weights of other substances, such as soil, from the weight value received by the measured weight reception unit 510.

The weight calculation unit 520 may either calculate the weight of a single crop or the average weight of two or more crops.

The height calculation unit 530 calculates the height of the crop corresponding to the crop weight value calculated by the weight calculation unit 520 based on the growth information of the crop growth information unit 540.

The crop growth information unit 540 holds information including about information about the heights of crops corresponding to their weights and information about artificial light corresponding to the heights of the crops.

The light data extraction unit 550 extracts from the crop growth information unit 540 information about artificial light corresponding to the height of the crop calculated by the height calculation unit 530.

The distance control unit 560 calculates the distance between the crop and an artificial lighting device based on the information about artificial light extracted by the light data extraction unit 550, and then controls the height of the artificial lighting device based on the calculated distance. In this case, the distance control unit 560 controls the height of the artificial lighting device by controlling the control motor 30, thereby controlling the distance between the crop and the artificial lighting devices.

Next, a method of controlling lighting in a plant factory is described in detail with reference to FIG. 6.

Figure 6:
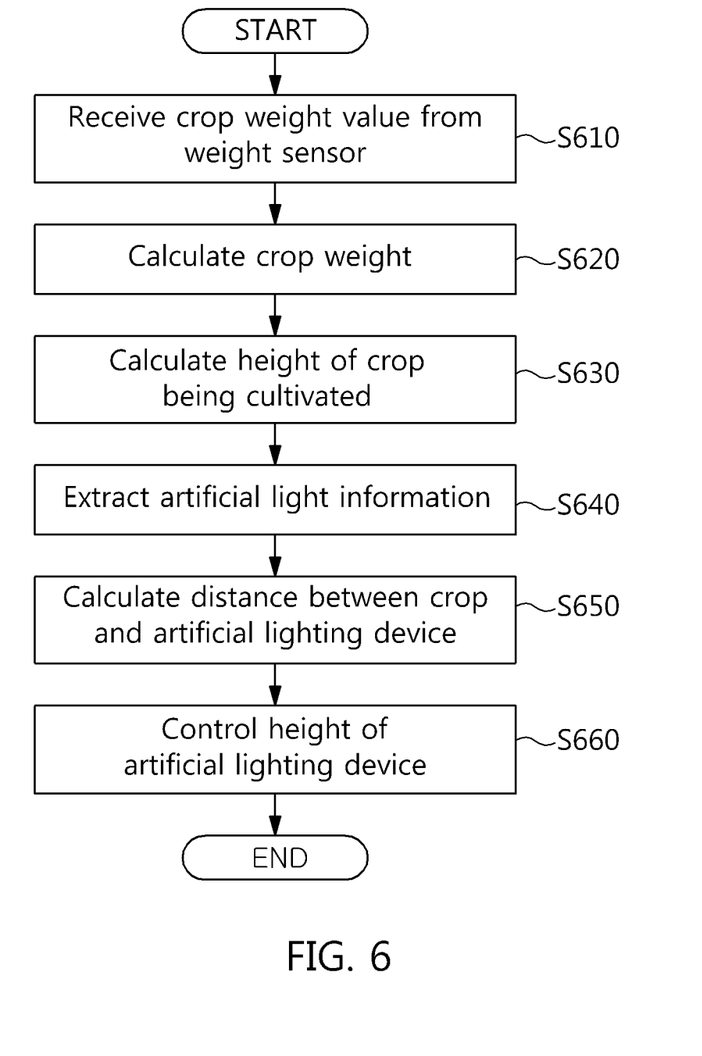
FIG. 6 is a flowchart illustrating a method of controlling lighting in a plant factory according to an embodiment of the present invention.

FIG. 6 is a flowchart illustrating the method of controlling lighting in a plant factory according to this embodiment of the present invention.

First, it is noted that an environment to which the method of controlling lighting in a plant factory according to an embodiment of the present invention is applied may include the weight sensor 40 configured to measure the weight of at least one crop, and the control motor 30 configured to control the height of an artificial lighting device based on an optimal energy value that is obtained based on the measured value, that is, a weight value, of the weight sensor 40 by an apparatus 500 for controlling lighting.

Referring to FIG. 6, the apparatus 500 for controlling lighting in a plant factory according to an embodiment receives a crop weight value from the weight sensor 40 at step S610. In this case, the weight value may be the weight of a single crop being cultivated or the weight of crops in a specified range of a single crop cultivation bed or the entire range thereof.

At step S620, the apparatus 500 for controlling lighting calculates a net crop weight by processing the crop weight value received at step S610. At step S620, the net crop weight is calculated by subtracting the weight of other substances, such as soil, from the received crop weight value.

The apparatus 500 for controlling lighting may either calculate the weight of a single crop or the average weight of two or more crops.

At step S630, the apparatus 500 for controlling lighting calculates the height of the crop corresponding to the crop weight value calculated at step S620 based on the growth information of the crop growth information unit 540. In this case, the crop growth information unit 540 holds information including information about the heights of crops corresponding to their weights and information about artificial light corresponding to the heights of the crops.

At step S640, the apparatus 500 for controlling lighting extracts from the crop growth information unit 540 information about artificial light corresponding to the height of the crop calculated at step S630.

The apparatus 500 for controlling lighting calculates the distance between the crop and an artificial lighting device based on the extracted information about artificial light at step S650, and then controls the height of the artificial lighting device based on the calculated distance between the crop and the artificial lighting device at step S660. In this case, the apparatus 500 for controlling lighting controls the height of the artificial light device by controlling the control motor 30, thereby controlling the distance between the crop and the artificial lighting device.

In accordance with at least one embodiment of the present invention, an apparatus and method for controlling lighting in a plant factory have the advantage of controlling artificial lighting in accordance with the growth rate of crops being cultivated in a plant factory, thereby minimizing the energy consumption of an artificial light source and also providing a uniform amount of artificial lighting to crops being cultivated.

Furthermore, in accordance with at least one embodiment of the present invention, an apparatus and method for controlling lighting in a plant factory have the advantage of minimizing the heat generation of an artificial light source, thereby reducing maintenance cost and side effects attributable to heat generation.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for controlling lighting in a plant factory, the method comprising:
   calculating a weight of at least one crop being cultivated based on a sensing result received from a weight sensor disposed in a crop cultivation bed;
   calculating a height of the crop based on information about growth of the crop corresponding to the weight of the crop;
   extracting information about artificial light corresponding to the height of the crop based on the information about growth of the crop; and
   controlling a height of an artificial lighting device based on the information about artificial light.

2. The method of claim 1, wherein controlling the height of the artificial lighting device comprises:
   calculating a distance between the crop and the artificial lighting device based on the information about artificial light; and
   controlling the height of the artificial lighting device based on the calculated distance.

3. The method of claim 1, wherein calculating the weight of the crop comprises calculating a net crop weight by subtracting weights of other substances, such as soil, from the received sensing result.

4. The method of claim 1, wherein the information about growth of the crop includes information about the height of the crop corresponding to the weight of the crop and the information about artificial light corresponding to the height of the crop.

5. The method of claim 1, wherein controlling the height of the artificial lighting device comprises controlling the height of the artificial lighting device by controlling a control motor corresponding to the artificial lighting device based on the information about artificial light.

6. An apparatus for controlling lighting in a plant factory, the apparatus comprising:
   a weight calculation unit configured to calculate a weight of at least one crop being cultivated based on a sensing result received from a weight sensor disposed in a crop cultivation bed;

a height calculation unit configured to calculate a height of the crop based on information about the growth of the crop corresponding to the weight of the crop;

a light information extraction unit configured to extract information about artificial light corresponding to the height of the crop based on the information about the growth of the crop; and a distance control unit configured to control a height of an artificial lighting device based on the information about artificial light.

7. The apparatus of claim 6, wherein the distance control unit calculates a distance between the crop and the artificial lighting device based on the information about artificial light, and controls the height of the artificial lighting device based on the calculated distance.

8. The apparatus of claim 6, wherein the weight calculation unit calculates a net crop weight by subtracting weights of substances, such as soil, from the received sensing result.

9. The apparatus of claim 6, further comprising a unit configured to store the information about growth of the crop, including information about the height of the crop corresponding to the weight of the crop and the information about artificial light corresponding to the height of the crop.

10. The apparatus of claim 6, wherein the distance control unit controls the height of the artificial lighting device by controlling a control motor corresponding to the artificial lighting device based on the information about artificial light.

* * * * *